Figure 5:
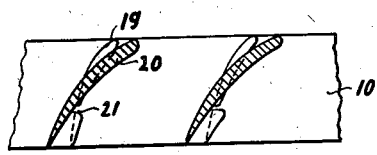

March 23, 1943.
H. E. CHITZ
2,314,572
TURBO-ENGINE
Filed Nov. 2, 1939
2 Sheets-Sheet 1
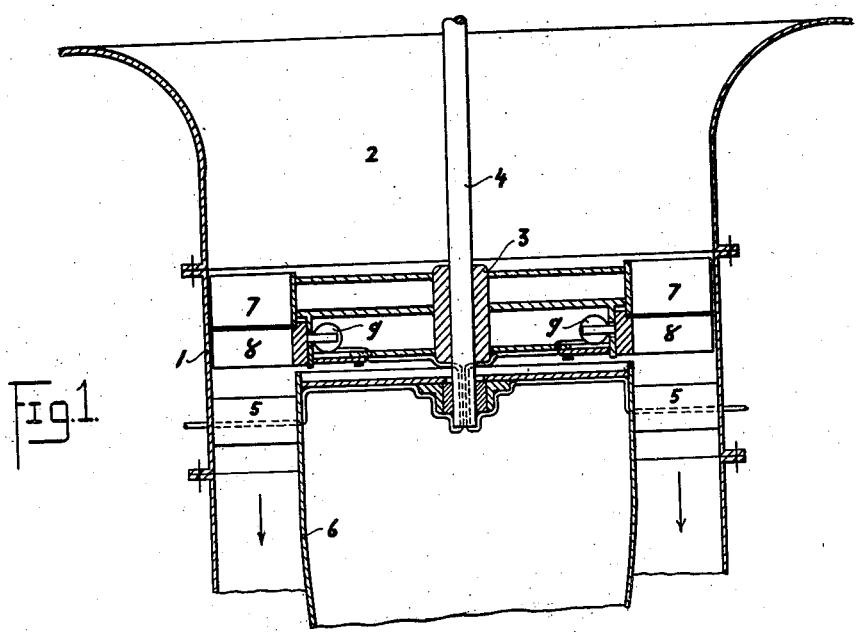
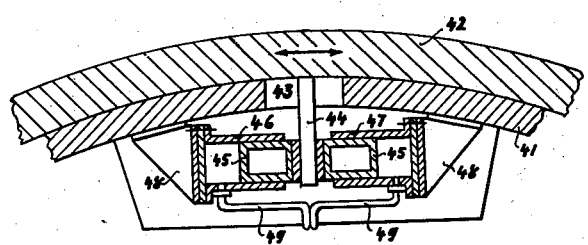
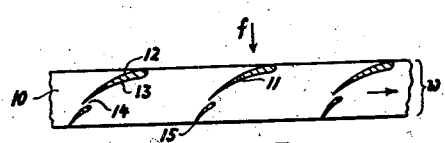
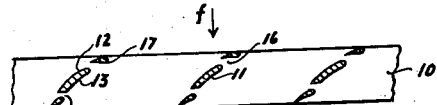
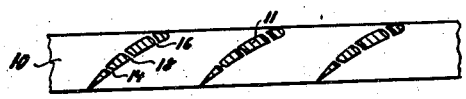
INVENTOR
*Herman E. Chitz.*
BY
ATTORNEY March 23, 1943.  H. E. CHITZ  2,314,572
TURBO-ENGINE
Filed Nov. 2, 1939  2 Sheets-Sheet 2

INVENTOR
Herman E. Chitz.
BY
ATTORNEY

Patented Mar. 23, 1943

2,314,572

UNITED STATES PATENT OFFICE 2,314,572

TURBOENGINE

Herman E. Chitz, East Cleveland, Ohio, now by judicial change of name Herman Ernst Sheets Application November 2, 1939, Serial No. 302,554 In Czechoslovakia December 7, 1938

11 Claims. (Cl. 230—120)

The present invention relates to turbo-engines, especially to engines for generating power from another kind of energy by means of the kinetic and/or the potential energy of a fluid, i. e. to turbines, or for generating pressure from mechanical energy by means of the kinetic energy of a fluid, i. e. to pumps or blowers. More particularly, the invention relates to the shape of the blades, especially of the runner blades of engines through which the fluid flows wholly or mainly or at least at the discharge edge of the blades essentially in an axial direction regarding the main axis of the engine. Blades with which the present invention is concerned are as to their shape generally characterized by the development of a lift according to lift coefficient and angle of attack. At any capacity under which an engine comprising such blades is operated, a pressure difference is caused due to higher pressure on the lower or working face and lower pressure on the upper face of the blades.

Although the fluid the kinetic energy of which is working in the turbo-engine can be of any kind, the advantage of the new blade will be most effective if the fluid is a gas, steam, vapor, or consists of a mixture of these mediums with other substances or with each other. While the invention, in its broader aspect, is capable of being applied to many kinds of turbo-machines for different purposes, it is preferably applicable to blowers. Therefore, for reason of simplicity, in the following specification the turbo-engine will be called "blower," and the fluid will be called "gas." The invention relates especially to engines the operating pressure of which in one stage is relatively small as compared with the discharge volume.

Machines of this kind generally comprise a shaft, blade carrying members surrounding the shaft, a plurality of blades arranged on said blade carrying members, and a casing closely surrounding said blades. The blade carrying members together with the blades attached to them form rotating wheels or the rotor, if they rotate during the operation of the machine, while the stationary guide blades are carried by guide wheels or the casing or simultaneously by both of them. Besides, these machines generally comprise: inlet, diffuser, and other devices which are however of less importance in connection with the present invention.

Particularly in blowers with small working pressure in one stage, a relatively small number of runner blades is provided which therefore have a comparatively large pitch. Consequently the velocity and pressure of the gas flow change between two blades. The largest difference of pressure is the one between the lower or working face and the upper face of each blade which causes the lift. At the same places exists the largest difference of velocity. With a constant number of blades and of revolutions the increase of pressure for the blower is proportional to the lift of a single blade. The flow of gas is correspondingly accelerated and decelerated respectively in its course from the leading edge to the discharge edge of the respective blade. The largest amounts of lift along the blades correspond to the largest pressure differences on both faces of the blades and consequently to the largest differences in velocity and acceleration of the gas flow. The lift and therefore the pressure-difference depends on the sectional shape of the blade and on the direction of flow of the fluid against the blade. The amount of lift is characterized by the lift coefficient which increases with the angle of attack, but there is a certain maximum which this coefficient is not allowed to exceed. If the angle of attack increases furthermore, stalling or flow separation from the blade surface occur and therewith formation of eddies by which the lift is decreased. By this limitation of the lift coefficient the entire increase of pressure in the blower is finally limited.

The primary object of the present invention is to improve the flow through the blades under certain conditions by enlarging the lift coefficient. To this end one or more slots are provided in certain areas of each blade or of some of the blades. The stalling of the flow occurs in connection with decreasing velocity of gas particles flowing directly over the faces of the blades due to the effect of viscosity, these gas particles being kept as dead flow between the face of the blade and the outer flow. The gas particles follow a flow pattern which can be explained by superimposing the flow of the fluid through the blades and a circulation flow around each blade. The superimposing of these flows results in the pressure difference between the lower and upper faces of the blades and in a certain pressure distribution along each side of the blades. If a part of the gas flows with high velocity through the slot or slots according to the invention, a new impulse is imparted to the gas particles which are decreased in their velocity, which impulse enables them to advance against the pressure increase thus avoiding an accumulation of dead flow and thus preventing stalling and eddy formation. It is therefore possible by arranging the slots according to the invention to achieve considerably higher factors of lift coefficient by influencing the flow pattern. The slots are of advantage at any operating conditions of the machine.

The invention consists in the arrangements and combinations as shown for example in the accompanying drawings and as set forth in the claims, the drawings being however purely illustrative and in no manner limitative.

Figure 6:
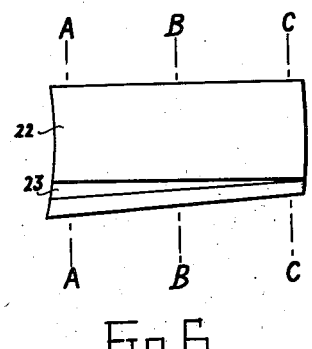
Figures 6A, 6B, 6C:
Figure 7:
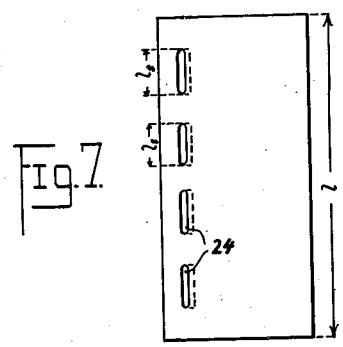
Figure 8:
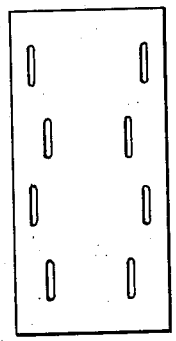
Figure 9:
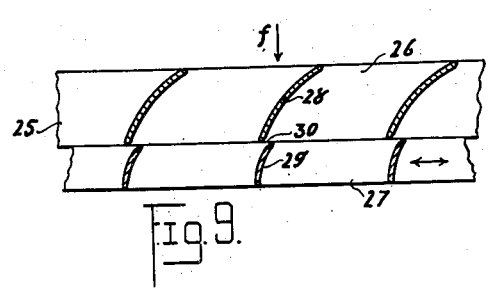
Figure 10:
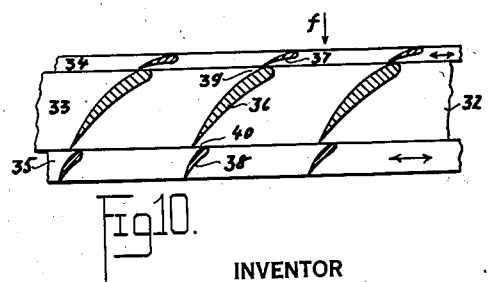

In the drawings:

Fig. 1 shows a diagrammatic vertical section through a part of a blower to which the invention may be applied, Fig. 2 is a vertical section along a circular line coaxial with a runner wheel through a part of a runner wheel of a blower developed into a plane, Figs. 3, 4, and 5 are sections similar to Fig. 2 for other embodiments of the invention, Fig. 6 shows a plan view of a blade with a slot of varying width, and Figs. 6A, 6B, and 6C are cross sections taken on lines A—A, B—B and C—C respectively, of Fig. 6, Fig. 7 is a plan view of a blade with one row of short slots, Fig. 8 is a plan view of a blade with a number of rows of slots, Figs. 9 and 10 are sections similar to Figs. 2-5 with adjustable slots in the runner blades, Fig. 11 is a horizontal cross section through a governing mechanism for adjustable slots.

Similar numerals refer to similar parts throughout the various views.

Referring to Fig. 1 which shows the general construction of a blower, 1 is the casing with a flow inlet 2, a runner blade carrying member 3 mounted on a shaft 4, guide blades 5, and a diffuser 6 which is only partly shown. Fixed on the blade carrying member 3 are the runner blades 7 which consist in this special case of a part 7 rigidly fixed to the blade carrying member and a part 8 which is movable relatively to part 7, a slot being formed between these two parts or sections. The mechanism 9 for controlling the movement of the blade sections 8 will be later explained. The gas flows through the blower in the direction shown by the arrows.

Referring now to Fig. 2, 10 is a section cut out of a runner wheel which rotates in the direction as shown by the arrow. The runner blades 11 have, relatively to the gas flow $f$, an upper face 12 and a lower side 13. The pressure on the upper face is low as compared with the pressure on the lower face of the blade. Each blade 11 is, according to the present invention, provided with a slot 14 which runs essentially parallel to the longitudinal edges of the respective blade, i. e. transversely to the direction of the gas flow.

The place or places of a blade profile where the slot or slots are to be arranged may be found either by experience or in the following way: While a transformation of pressure energy into kinetic energy can be performed without essential losses, disturbances in the flow of a fluid and eddy formation losses easily arise when kinetic energy is to be transformed into pressure energy. In case that the distribution of the pressure and the velocity of the flow along the blade profile are known, the slot or slots are preferably arranged at places where a high pressure increase and therefore a deceleration of the flow exist. The slot or slots which pass all through the thickness of the blade divide the blade relative to the direction of flow of the fluid into a leading and a trailing part, the rear edge of the leading part being located backwards of the front edge of the trailing part.

In the special case illustrated in Fig. 2 the slot is arranged in a distance from the discharge edge 15 of the blade of about ⅓ of the width $w$ of the blade. This distance corresponds to the place of largest pressure increase if a certain kind of profile with a certain small positive angle of attack is chosen.

A second increase of pressure exists at the leading edges of the blades. According to Fig. 3 therefore a second slot 16 is arranged at a distance from this leading edge 17. Fig. 4 shows three slots 14, 16, 18 in each blade 11. It may be pointed out that it is not necessary, though mostly desirable, to provide each blade of a blade carrier or wheel with one or more slots, or to provide every single blade with the same number of slots.

As every blade extends from the inner hub to the tip diameter of the wheel the circumferential velocity increases along the blade from its inner to its outer part. Each part of the blade however should cause a certain increase of pressure to avoid undesired components of flow. For this reason it is necessary to have larger factors of lift coefficient at the hub where the circumferential velocity is small. Therefore, in some cases, the blade may be formed in such a manner as to provide a slot only near the hub where the high lift coefficient is wanted, while no slot is arranged near the outer end of the blade. This embodiment of the invention is shown in Fig. 5 where 19 represents the profile of the blade near the hub and 20 represents its profile near the tip diameter. In this case only the inner profile is provided with a slot 21 which therefore extends only over a part of the length of the blade.

If the slot is of considerable length its width may increase from the tip diameter to the hub in order to achieve higher factors of lift at the hub. Figs. 6, 6A, 6B, and 6C show a plan view and sections of a blade 22 with a slot 23 of varying width.

The slot or slots must not be continuous over their whole length, but may be interrupted and therefore consist of several short slots. This is shown in Fig. 7 where of course the sum of lengths $l_s$ is smaller than the blade length $l$. In this case the small slots 24 are arranged in a single row.

The slots may also be arranged in several rows whereby the slots of the single rows may be arranged one beside the other or staggered. The latter embodiment is illustrated in Fig. 8.

Instead of providing one or more slots in the single blade the slots may be formed between two or more separate parts or sections of which the blades are made. In this case different constructions are possible. For instance the member carrying the blades may consist of a plurality of separate wheels movable against each other by a certain angle each wheel carrying corresponding parts of the single blades. Or one or some parts of each blade may be movable around an axis by which motion the slot between two adjacent parts of the blade becomes wider or narrower. Fig. 9 shows an embodiment of the invention where the runner wheel 25 consists of two parts 26 and 27 which are movable relatively to each other around their common axis.

The gas flows from the intake of the blower in the direction *f* first through the parts 28 of the blades and then through parts 29. The adjustable space or slot 30 lies between parts 28 and 29 of the blades. Parts 29 are fixed on a common carrier 27 which is adapted to be moved in both directions shown by the double arrow.

Fig. 10 shows a rotor 32 which comprises three divisions 33, 34, 35 with which the blade sections 36, 37, 38 are connected respectively forming two slots 39 and 40 between the respective sections of each blade. In the embodiment shown in the drawings, according to the arrows, sections 34 and 35 are movable around their common axis relatively to section 33 so that all slots are adjustable.

Fig. 11 shows a horizontal section through a control mechanism as it may be applied for moving the parts in order to adjust the width of the slots which controlling means are diagrammatically shown in Fig. 1. 41 may be a part of a runner wheel which carries one section of the blades, not shown in the drawings, while 42 is the part of the wheel which is movable relatively to part 41 and carries the other sections of the blades, likewise not shown. Connected with part 42 and projecting inwards through a slot 43 of part 41 is a shaft 44 on which a double piston 45 is mounted. The two parts of the piston slide in two cylinders 46, 47 which are fixed to part 41 of the wheel by means of supports 48. Pipes 49 supply the necessary fluid, e. g. oil, for the operation of the mechanism. It can easily be understood that by supplying oil to one of the cylinders part 42 is moved relatively to part 41 by a certain amount, whereby the slots between the blade sections are adjusted.

Numerous attempts have been made to improve the conditions of flow at the blades of turbo-engines, but it has never been proposed to provide blades, which are shaped so as to cause in the fluid an essential pressure difference between the upper and lower face of each blade and which are characterized by lift coefficient and angle of attack, with one or more slots as claimed by the present invention. It may be understood that the invention is not limited to any particular construction or form, as it is capable of numerous modifications of turbo-engines without departing from the scope of the claims. Though the present specification refers mainly to runner blades, the invention may also be of advantage for guide blades if the conditions under which the invention is effective are fulfilled.

What I claim is:

1. A turbo-engine comprising in combination a runner wheel, a plurality of blades arranged in a circle to form said runner wheel, each of said blades comprising a plurality of sections, slots formed between said sections and disposed transverse to the direction of flow of the fluid which flows through said turbo-engine, rings displaceable relatively to each other around a common axis, each of said rings carrying corresponding blade sections, a cylindrical extension on one of said rings said cylindrical extension being located inside another of said rings, at least one pair of cylinders operated by a fluid and supported by said cylindrical extension, said cylinders being closed at all but one sides and being coaxially disposed facing each other with their open sides, a piston common to said cylinders, said piston being connected with a shaft projecting through a slot of said cylindrical extension and attached to the outer of said rings, and pipes connected with said cylinders for feeding and discharging said fluid for the operation of said cylinders.

2. A turbo-engine comprising a shaft, a blade carrying member surrounding said shaft, a plurality of blades arranged on said blade carrying member around said shaft, and a cylindrical casing closely surrounding said blades, said blades having a shape which develops a lift according to lift coefficient and angle of attack and causes at any capacity under which the engine is operated a pressure difference due to higher pressure on the lower or working face and lower pressure on the upper face of the blades, slots in said blades in the areas of highest pressure increases along at least one side of said blades between the leading and discharge edges, at least one of said slots being located closer to the discharge edge of the blade than to its leading edge, said slots being disposed transverse to the direction of flow of the fluid flowing through said turbo-engine and allowing part of said fluid to pass from the lower or working face of the blades to their upper face causing thereby a partial compensation of said pressure difference between the upper and lower face of said blades.

3. A turbo-engine comprising a shaft, a blade carrying member surrounding said shaft, a plurality of blades arranged on said blade carrying member around said shaft, and a cylindrical casing closely surrounding said blades, said blades having a shape which develops a lift according to lift coefficient and angle of attack and causes at any capacity under which the engine is operated a pressure difference due to higher pressure on the lower or working face and lower pressure on the upper face of the blades, a slot in each blade in the area of highest pressure increase between the leading and discharge edge along one side of said blade, said slot being disposed transverse to the direction of flow of the fluid flowing through said turbo-engine and allowing part of said fluid to pass from the lower or working face of the blades to their upper face causing thereby a partial compensation of said pressure difference between the upper and lower face of said blades.

4. A turbo-engine comprising a shaft, a blade carrying member surrounding said shaft, a plurality of blades arranged on said blade carrying member around said shaft, and a cylindrical casing closely surrounding said blades, said blades having a shape which develops a lift according to lift coefficient and angle of attack and causes at any capacity under which the engine is operated a pressure difference due to higher pressure on the lower or working face and lower pressure on the upper face of the blades, slots at a distance of about ⅓ of the width of the blade from the discharge edge of said blade, said slots being disposed transverse to the direction of flow of the fluid flowing through said turbo-engine and allowing part of said fluid to pass from the lower or working face of the blades to their upper face causing thereby a partial compensation of said pressure difference between the upper and lower face of said blades.

5. A turbo-engine comprising a shaft, a blade carrying member surrounding said shaft, a plurality of blades arranged on said blade carrying member around said shaft, and a cylindrical casing closely surrounding said blades, said blades having a shape which develops a lift according to lift coefficient and angle of attack and causes at any capacity under which the engine is operated a pressure difference due to higher pressure on the lower or working face and lower pressure on the upper face of the blades, slots in said blades in the areas of highest pressure increases along at least one side of said blades between the leading and discharge edges, said slots increasing in width radially inward and being disposed transverse to the direction of flow of the fluid flowing through said turbo-engine and allowing part of said fluid to pass from the lower or working face of the blades to their upper face causing thereby a partial compensation of said pressure difference between the upper and lower face of said blades.

6. A turbo-engine comprising a shaft, a blade carrying member surrounding said shaft, a plurality of blades arranged on said blade carrying member around said shaft, and a cylindrical casing closely surrounding said blades, said blades having a shape which develops a lift according to lift coefficient and angle of attack and causes at any capacity under which the engine is operated a pressure difference due to higher pressure on the lower or working face and lower pressure on the upper face, each of said blades comprising a plurality of sections forming a slot between each two consecutive sections, each slot being disposed transverse to the direction of flow of the fluid flowing through said turbo-engine and being located in an area of high pressure increase between the leading and discharge edge along one side of said blades and allowing part of said fluid to pass from the lower or working face of the blades to their upper face causing thereby a partial compensation of said pressure difference between the upper and lower face of said blades.

7. A turbo-engine comprising a shaft, a blade carrying member surrounding said shaft, a plurality of blades arranged on said blade carrying member around said shaft, and a cylindrical casing closely surrounding said blades, said blades having a shape which develops a lift according to lift coefficient and angle of attack and causes at any capacity under which the engine is operated a pressure difference due to higher pressure on the lower or working face and lower pressure on the upper face of the blades, each of said blades comprising a plurality of sections forming a slot between each consecutive sections, said sections being adjustable and the slots disposed transverse to the direction of flow of the fluid flowing through said engine and being located in an area of highest pressure increase between the leading and discharge edge along one side of said blades and allowing part of said fluid to pass from the lower or working face of the blades to their upper face causing thereby a partial compensation of said pressure difference between the upper and lower face of said blades.

8. A turbo-engine comprising a shaft, a blade carrying member surrounding said shaft, a plurality of blades arranged on said blade carrying member around said shaft, and a cylindrical casing closely surrounding said blades, said blades having a shape which develops a lift according to lift coefficient and angle of attack and causes at any capacity under which the engine is operated a pressure difference due to higher pressure on the lower or working face and lower pressure on the upper face of the blades, a row of short slots substantially parallel to the discharge edge of said blades in an area of high pressure increase along one side of the blades, said slots allowing part of the fluid flowing through said turbo-engine to pass from the lower or working face of the blades to their upper face causing thereby a partial compensation of said pressure difference between the upper and lower face of said blades.

9. A turbo-engine comprising a shaft, a blade carrying member surrounding said shaft, a plurality of blades arranged on said blade carrying member around said shaft, and a cylindrical casing closely surrounding said blades, said blades having a shape which develops a lift according to lift coefficient and angle of attack and causes at any capacity under which the engine is operated a pressure difference due to higher pressure on the lower or working face and lower pressure on the upper face of the blades, a plurality of short slots staggered relatively to each other and disposed as a group transverse to the direction of flow of the fluid flowing through said turbo-engine, and being located in areas of high pressure increase along the lower or working face and the upper face of said blades allowing part of said fluid to pass from the lower or working face of the blades to their upper face causing thereby a partial compensation of said pressure difference between the upper and lower face of said blades.

10. In a turbo-engine comprising a shaft, a blade carrying member surrounding said shaft, a casing around said blade carrying member, and a space between said blade carrying member and said casing, blades arranged on said blade carrying member within said space and extending close to said casing, each blade being shaped as to develop a lift according to lift coefficient and angle of attack and having, in at least one area where a high pressure increase exists during the cooperation of said blades with the fluid passing through said turbo-engine, a slot of random length substantially parallel to the discharge edge of the blade, said slot passing all through the thickness of the blade and dividing said blade relative to the direction of flow of the fluid into a leading or trailing part, the rear edge of said leading part being located backwards of the front edge of said trailing part.

11. In a turbo-engine comprising a shaft, a blade carrying member surrounding said shaft, a casing around said blade carrying member, and a space between said blade carrying member and said casing, blades arranged on said blade carrying member within said space and extending close to said casing, each blade being shaped as to develop a lift according to lift coefficient and angle of attack and having a slot at a distance of about ⅓ of the width of the blade from the discharge edge of said blade and substantially parallel to said discharge edge, said slot passing all through the thickness of the blade and dividing said blade relative to the direction of flow of the fluid into a leading and a trailing part, the rear edge of said leading part being located backwards of the front edge of said trailing part.

HERMAN E. CHITZ.